(12) United States Patent
Ku et al.

(10) Patent No.: US 7,295,219 B2
(45) Date of Patent: Nov. 13, 2007

(54) DISPLAY DRIVER CHIPS AND METHODS HAVING REDUCED STORAGE OF IMAGE DATA AND/OR ON-SCREEN DISPLAY (OSD) DATA

(75) Inventors: Yong Guen Ku, Seoul (KR); Sang Hun Kim, Seoul (KR)

(73) Assignee: Samsung Electronics Co., Ltd. (KR)

( * ) Notice: Subject to any disclaimer, the term of this patent is extended or adjusted under 35 U.S.C. 154(b) by 148 days.

(21) Appl. No.: 10/827,931

(22) Filed: Apr. 20, 2004

(65) Prior Publication Data

US 2005/0062754 A1  Mar. 24, 2005

(30) Foreign Application Priority Data

Sep. 22, 2003  (KR) .......................... 2003-0065636

(51) Int. Cl.
*G09G 5/00* (2006.01)
*G09G 5/36* (2006.01)
*H04N 5/445* (2006.01)
*H04N 5/50* (2006.01)

(52) U.S. Cl. .................... 345/629; 345/560; 348/564; 348/569

(58) Field of Classification Search ................ 345/545, 345/560, 592, 629; 348/564, 565, 569
See application file for complete search history.

(56) References Cited

U.S. PATENT DOCUMENTS

| 5,640,502 | A  | * | 6/1997  | Knox et al. ................ 345/554 |
| 5,969,727 | A  | * | 10/1999 | Kaneko ..................... 345/536 |
| 6,288,750 | B1 | * | 9/2001  | Yamada et al. ............ 348/553 |
| 6,351,292 | B1 | * | 2/2002  | Knox et al. ................ 348/569 |
| 6,888,577 | B2 | * | 5/2005  | Waki et al. ................ 348/589 |
| 6,928,118 | B1 | * | 8/2005  | Otome .................... 375/240.21 |

OTHER PUBLICATIONS

Renesas, "*Preliminary Specification for the Renesas HD66784, 262, 144-color, 176×320 dot Graphics Controller Driver for TFT LCD with Main/Sub Panel Simultaneous Drive*", Revision 0.2, Jul. 14, 2003.

* cited by examiner

*Primary Examiner*—Kee M. Tung
*Assistant Examiner*—Hau H Nguyen
(74) *Attorney, Agent, or Firm*—Myers Bigel Sibley & Sajovec, P.A.

(57) ABSTRACT

Image data and/or On-Screen Display (OSD) data is generated for display on a display having rows of pixels by repeatedly combining a portion of the OSD data and a portion of the display data in a display driver chip without storing more than the portion of the display data and/or the portion of the OSD data in the display driver chip at any time. The driver chip memory thereby may be reduced.

15 Claims, 13 Drawing Sheets

DISPLAY DRIVER CHIPS AND METHODS HAVING REDUCED STORAGE OF IMAGE DATA AND/OR ON-SCREEN DISPLAY (OSD) DATA

RELATED APPLICATION

This application claims the benefit of Korean Patent Application No. 2003-0065636, filed Sep. 22, 2003, the disclosure of which is hereby incorporated herein by reference in its entirety as if set forth fully herein.

FIELD OF THE INVENTION

This invention relates to graphics displays and graphic displaying methods, and more particularly to display driver chips and display driving methods for graphics displays.

BACKGROUND OF THE INVENTION

Graphics displays are widely used for displaying image data, which can include still image and/or video (moving image) data. A graphics display generally includes a plurality of rows and columns of pixels. Color graphics displays may include a plurality of rows and columns of red, green and blue (RGB) pixels. The design and operation of graphic displays, which will also be referred to herein simply as "displays", are well known to those having skill in the art and need not be described further herein.

It is also known to provide display driver chips (integrated circuits) that can provide controllers, drivers, Random Access Memory (RAM) and/or other components that may be used to drive a display. The display driver chip may obtain data from a processor, such as an application processor and/or a microprocessor, and may store and output this data in a manner which is appropriate to drive a display. The overall design and operation of display driver chips also are well known to those having skill in the art and need not be described in detail herein. A display driver chip also may be referred to as a "graphics controller chip."

Many devices that include a display provide an On-Screen Display (OSD) function, wherein image data and other information are independently displayed. The other information, referred to herein as "OSD data", may relate to setup information, programming information, menu information, user messages, and/or other information that may be displayed on the display, independent of the image data that is displayed thereon. For example, FIGS. 1A and 1B illustrate a display wherein image data 110 is displayed on all of the rows and columns of the display and wherein OSD data 120 is independently displayed on the display. As shown in FIGS. 1A and 1B, the OSD data 120 may be blended with the image data 110. Moreover, although FIGS. 1A and 1B illustrate OSD data 120 at the bottom of the image data 110, the OSD data may be placed at any portion(s) of the image data. Multiple OSD data regions also may be provided. The design and use of OSD data are well known to those having skill in the art, and need not be described further herein.

FIG. 2 is a block diagram of a conventional display driver chip for displaying image data and/or OSD data on a display having a plurality of rows of pixels. In FIG. 2, the image data may be provided in the format of RGB data. However, other conventional formats of providing image data may be used for color displays, and RGB data may not be used for monochrome displays. As shown in FIG. 2, a conventional display driver chip 200 may be used for displaying image data and/or OSD data on a display 220 having a plurality of rows and columns of pixels. The display driver chip 200 includes an OSD data circuit 202, also referred to as an OSD memory, for storing OSD data, an image data circuit 204, also referred to as an image data memory, for storing the image data, an α-blending circuit 206 and a multiplexer (Mux) 208.

Still referring to FIG. 2, the image data circuit 204 receives image data, such as RGB data, from a processing circuit 230. In some displays, the processing circuit 230 may include a microprocessor 232 and an application processor 234. The image data circuit 204 may receive image data from the microprocessor 232 for still images, and from an application processor 234 for moving images (video), and stores the received image data in a memory in the image data circuit 204. The image data circuit 204 reads the image data stored in the memory row-by-row, and outputs the row to the α-blending circuit 206 and the Mux 208.

The OSD data circuit 202 receives OSD data from the processing circuit 230 and, in some embodiments, from the microprocessor 232 of the processing circuit 230, and stores the received OSD data in a memory in the OSD data circuit 202. The OSD data circuit 202 reads the OSD stored in the memory row-by-row, and outputs the data to the α-blending circuit 206.

The α-blending circuit 206 performs the operations of blending the image data and the OSD data in the OSD region, to blend, for example, 0%, 50% or 100% of the image data along with the OSD data, and thereby provide an unblended image or a blended image with various degrees of blending with the OSD data. Finally, the Mux 208 selects the image data and/or the α-blended data from the α-blending block 206, in response to a display control signal 236 from the processing block 230 and, in some cases, from the microprocessor 232, to thereby generate source data 222 to drive the display 220.

FIG. 3A is a more detailed block diagram of an image data circuit 204 of FIG. 2. In particular, as shown in FIG. 3A, the image data circuit 204 may be responsive to the microprocessor 232 for still image data and to the application processor 234 for moving picture data. The image data circuit 204 includes a display memory circuit 302 that is configured and sized so as to store therein an entire display image, for example, 132×176, 320×240 or 640×230 pixels of image data and an image line circuit 304, which reads the image data stored in the display memory circuit, line-by-line, and outputs this data to the α-blending circuit 206 and the Mux 208 line-by-line.

FIG. 3B is a block diagram of a conventional OSD data circuit 202. As shown in FIG. 3B, the OSD data circuit 202 includes an OSD memory circuit 312 that is configured to store the entire OSD data, for example 132×40, 320×40 or 640×80 of OSD data, and an OSD line circuit 314, which reads the OSD data stored in the OSD memory circuit 312 line-by-line and outputs the OSD data to the α-blending block 206.

An example of a display driver chip that includes OSD data circuitry thereon is described in the "*Preliminary Specification for the Renesas HD66784, 262, 144-color, 176×320 dot Graphics Controller Driver for TFT LCD with Main/Sub Panel Simultaneous Drive*", by Renesas, Revision 0.2, Jul. 14, 2003. More specifically, Page 8 of this Preliminary Specification illustrates a block diagram of the driver and Page 96 illustrates a "base image area" and multiple "OSD image areas" in HD66784 RAM data.

Graphics displays may be increasingly used in small and/or portable devices such as wireless terminals, including cellular telephones, and/or in portable devices such as palmtop computers, wherein space may be at a premium and wherein it may be desirable to reduce power consumption. Even in larger and/or non-portable devices, it may be desirable to conserve space and/or power in the display driver.

SUMMARY OF THE INVENTION

Some embodiments of the present invention provide display driver chips for displaying image data and/or On-Screen Display (OSD) data on a display having a plurality of rows of pixels. In some embodiments, these display driver chips comprise an OSD data circuit that is configured to store at least a portion of the OSD data and to output the stored OSD data row-by-row. An image data circuit is configured to store only a single row of the image data to be displayed and to output the single row of the image data that was stored. A combining circuit is configured to selectively combine the row-by-row OSD data and the single row of the image data, to drive the display. Accordingly, the image data circuit may be reduced in size compared to conventional image data circuits, according to some embodiments of the present invention. Since the image data circuit of a conventional display driver chip may be up to about 20% of the area of the display driver chip, the size of the display driver chip may be reduced. Moreover, power consumption also may be reduced correspondingly.

In some embodiments of the present invention, the image data circuit includes an image row control circuit that is configured to receive the image data row-by-row, and a single image row storing circuit that is responsive to the image row control circuit and that is configured to store a single image row of the image data that is received row-by-row and to output the single image row of the image data that was stored. In some embodiments, the image row control circuit comprises a shift register, and the single image row storing circuit comprises a plurality of latches. The number of stages in the shift register and the number of latches may correspond to the number of pixels in a row. In some embodiments, the image data circuit is free of memory that stores a plurality or rows of the image data.

In other embodiments of the invention, the size of the OSD data circuit also may be reduced. For example, in some embodiments, the OSD data circuit includes an OSD memory circuit that is configured to store the entire OSD data and an OSD row storing circuit that is responsive to the OSD memory circuit and that is configured to store a row of the OSD data from the OSD memory circuit. However, in other embodiments of the invention, the OSD data circuit comprises an OSD row control circuit that is configured to receive the OSD data row-by-row and a single OSD row storing circuit that is responsive to the OSD row control circuit and that is configured to store a single row of the OSD data that is received row-by-row, and to output the single row of the OSD data that was stored. Accordingly, the size of the OSD memory circuit can also be reduced in some embodiments of the present invention.

In some embodiments of the present invention, the combining circuit includes an alpha-blending circuit that is responsive to the row-by-row OSD data and the single row of image data, and that is configured to selectively blend the row-by-row OSD data and the single row of image data. The combining block may also include a multiplexer that is responsive to the alpha-blending block and to the single row of image data, and that is configured to multiplex the row-by-row OSD data and the single row of image data that are selectively blended, and the single row of image data, in response to a display control signal.

Embodiments of the present invention have been described above in connection with single row storing of the image data and/or the OSD data. However, other embodiments of the present invention may store only a portion of the image data and/or only a portion of the OSD data, wherein the portion includes one or more rows. Thus, display driver chips according to some embodiments of the present invention, include an OSD data circuit that is configured to store at least a portion of the OSD data and to output at least a subset of the portion of the OSD data from the stored OSD data. An image data circuit is configured to store only a portion of the plurality of rows of image data, and to output at least a subset of the portion of the plurality of image data that was stored. A combining block also may be provided, as was described above.

Methods for generating image data and/or OSD data according to some embodiments of the present invention, include repeatedly combining a portion of the OSD data and a portion of the display data in a display driver chip, without storing more than the portion of the display data in the display driver chip at any time. In some embodiments, the portion of the OSD data is a single row of OSD data, and/or the portion of the image data is a single row of image data. In other embodiments, the portion of the OSD data is at least two rows of OSD data, and/or the portion of the image data is at least two rows of image data. In still other embodiments, the portion of the OSD data and/or the portion of the display data are repeatedly combined in the display driver chip without storing more than the portion of the display data and the portion of the OSD data in the display driver chip at any time.

DETAILED DESCRIPTION

Figure 1A:
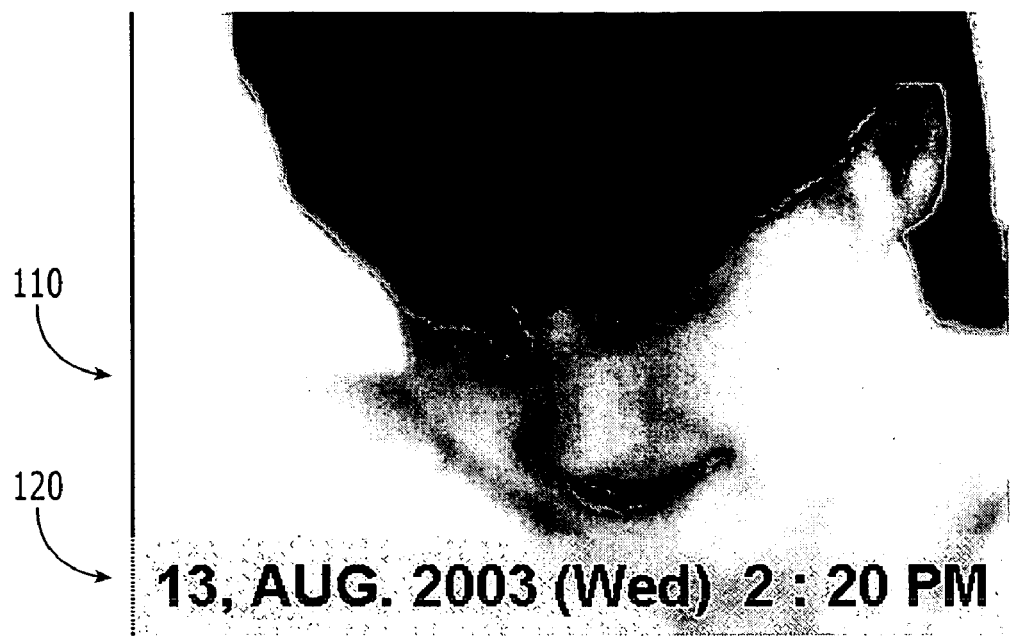
FIGS. 1A and 1B illustrate displays that include OSD data thereon.
Figure 1B:

The present invention now will be described more fully hereinafter with reference to the accompanying figures, in which embodiments of the invention are shown. This invention may, however, be embodied in many alternate forms and should not be construed as limited to the embodiments set forth herein.

Accordingly, while the invention is susceptible to various modifications and alternative forms, specific embodiments thereof are shown by way of example in the drawings and will herein be described in detail. It should be understood, however, that there is no intent to limit the invention to the particular forms disclosed, but on the contrary, the invention is to cover all modifications, equivalents, and alternatives falling within the spirit and scope of the invention as defined by the claims. Like numbers refer to like elements throughout the description of the figures.

The present invention is described below with reference to block diagrams and/or flowchart illustrations of methods and/or display driver chips according to embodiments of the invention. It is understood that some blocks of the block diagrams and/or flowchart illustrations, and combinations of blocks in the block diagrams and/or flowchart illustrations, may be implemented by computer program instructions. These computer program instructions may be provided to a processor of a general purpose computer, special purpose computer, and/or other programmable data processing apparatus to produce a machine, such that the instructions, which execute via the processor of the computer and/or other programmable data processing apparatus, create means for implementing the functions/acts specified in the block diagrams and/or flowchart block or blocks.

These computer program instructions may also be stored in a computer-readable memory that can direct a computer or other programmable data processing apparatus to function in a particular manner, such that the instructions stored in the computer-readable memory produce an article of manufacture including instructions which implement the function/act specified in the block diagrams and/or flowchart block or blocks.

The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions/acts specified in the block diagrams and/or flowchart block or blocks.

As will be appreciated by one of skill in the art, the present invention may be embodied as a method, data processing system and/or computer program product. Thus, the present invention may take the form of an entirely hardware embodiment, an entirely software embodiment or an embodiment combining software and hardware aspects, which may be collectively referred to herein as a "circuit" or "module".

It should also be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved.

Figure 4:
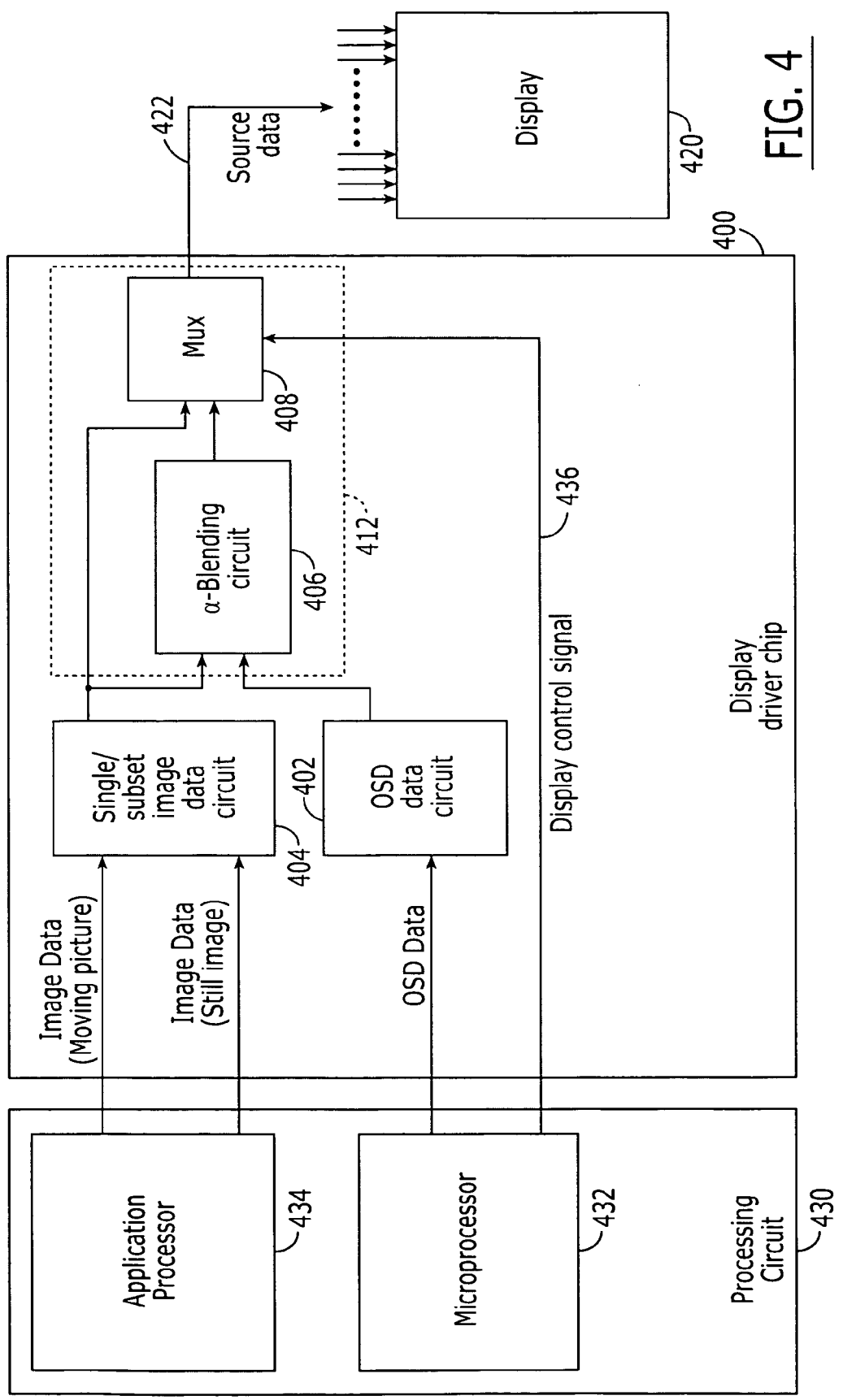
FIG. 4 is a block diagram of display driver chips according to some embodiments of the present invention.

FIG. 4 is a block diagram of display driver chips according to some embodiments of the present invention, for displaying image data and/or On-Screen Display (OSD) data on a display 420 having a plurality of rows of pixels. As shown in FIG. 4, these display driver chips 400 can include an OSD data circuit 402 that is configured to store at least a portion of the OSD data, and to output the stored OSD data row-by-row. An image data circuit 404 is configured to store only a single row of the image data to be displayed, and to output the single row of the image data that was stored. A combining circuit 412 is configured to selectively combine the row-by-row OSD data and the single row of image data, to drive the display 420. Accordingly, in some embodiments of FIG. 4, a single row of the image data is stored in the image data circuit 404 and the image data circuit 404 is free of memory that stores a plurality of rows of the image data. It will be understood that the image data circuit 404 can store other data that is not image data, i.e., data not to be displayed on the display 420. It will also be understood that, as used herein, the designations "row" and "column" are used to designate different display directions rather than absolute horizontal and vertical directions.

In other embodiments of FIG. 4, the OSD data circuit 402 is configured to store at least a portion of OSD data and to output at least a subset of the portion of the OSD data, which may be one or more rows of OSD data, from the stored OSD data. The image data circuit 404 is configured to store only a portion of the plurality of rows of image data, which may be one or more rows, but less than all rows, of the image data, and to output at least a subset of the portion of the plurality of rows of image data that was stored. Accordingly, row-by-row or portion-by-portion storage and output of image data and/or OSD data may be provided in the image data circuit 404 and/or OSD data circuit 402, according to various embodiments of the present invention.

As also shown in FIG. 4, in some embodiments of the invention, a processing circuit 430 provides the image data and the OSD data to the display driver chip 400. In some embodiments, the processing circuit can comprise an application processor 434 and a microprocessor 432. In some embodiments, the application processor 434 can provide the image data for both moving and still images to the image data circuit 404, and the microprocessor 432 can provide the OSD data to the OSD data circuit 402. Accordingly, the load on the microprocessor 432 may be reduced. In some embodiments, the processing circuit 430 may be at least partially integrated into the display driver chip 400.

In some embodiments of FIG. 4, the OSD data block 402 is configured to store the entire OSD data and to output the OSD data row-by-row or subset-by-subset. Moreover, in some embodiments of FIG. 4, the combining circuit 412 includes an alpha (α)-blending circuit 406 and a multiplexer (Mux) 408. The α-blending circuit 406 is responsive to the row-by-row OSD data and to the single row of image data or the subset of image data, and is configured to selectively blend the row-by-row OSD data and the single row (or subset) of image data. The multiplexer 408 is responsive to the α-blending circuit 406 and the single row of image data, and is configured to multiplex the row-by-row OSD data and the single row of image data that are selectively blended, and the single row of image data, in response to a display control signal 436, to generate source data 422 to drive the display 420.

Figure 5:
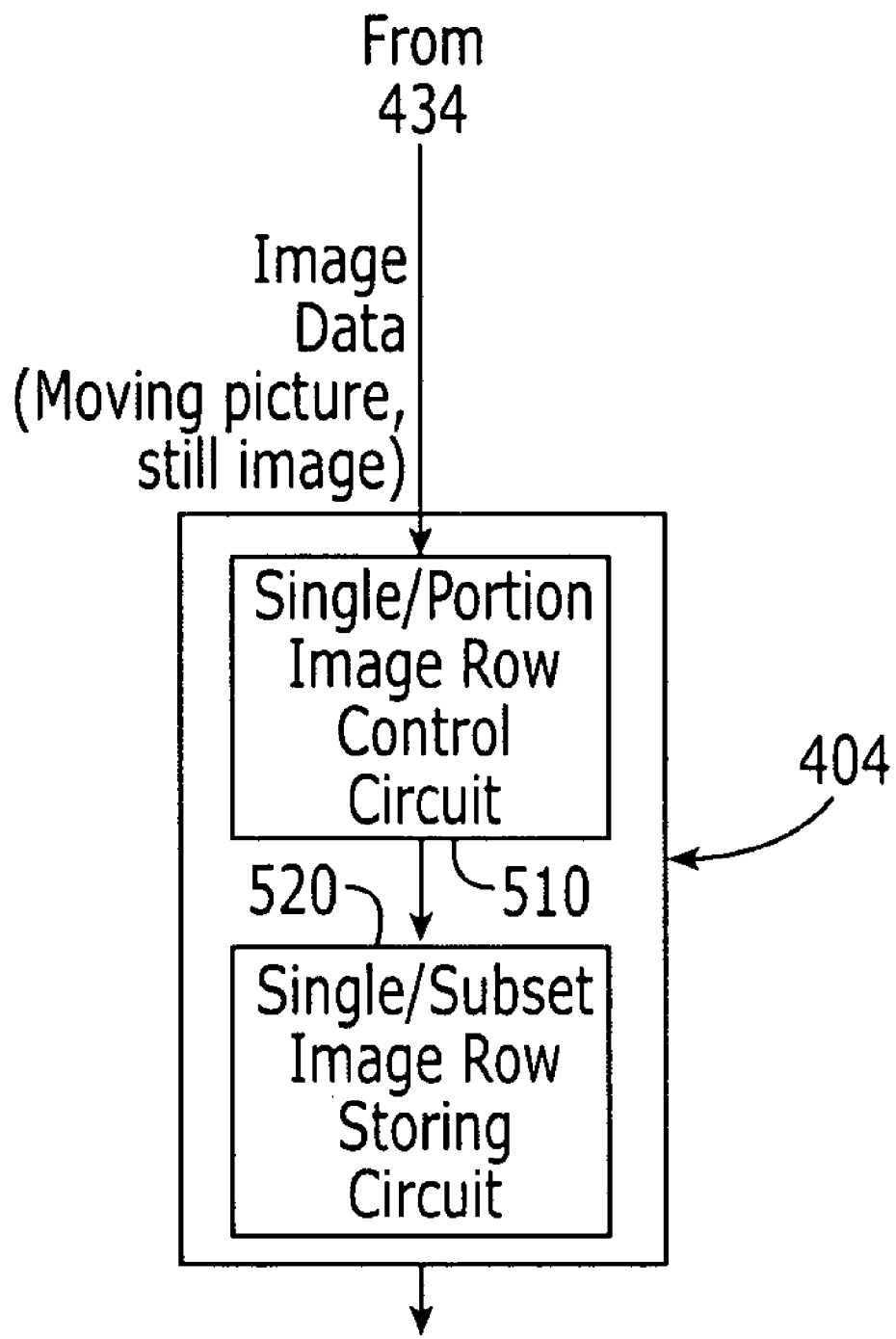
FIG. 5 is a block diagram of an image data circuit of FIG. 4 according to some embodiments of the present invention.

FIG. 5 is a block diagram of an image data circuit 404 of FIG. 4, according to some embodiments of the present invention. As shown in FIG. 5, in some embodiments, the image data circuit 404 comprises an image row control circuit 510 that is configured to receive the image data row-by-row and a single image row storing circuit 520 that is responsive to the image row control circuit 510, and is configured to store a single image row of the image data that is received row-by-row, and to output the single image row of the image data that was stored.

In other embodiments of FIG. 5, the image row control circuit 510 is configured to store only a portion of the image data. Moreover, the single image row storing circuit 520 may be configured to output at least a subset of the portion of the image data that was stored, i.e., to output one or more image data rows at a time. Thus, the image row control circuit 510 may be embodied as a single image row control circuit or a subset of image rows control circuit, and the image row storing circuit 520 may be embodied as a single image row storing circuit or a portion of image rows storing circuit.

Accordingly, in embodiments of the present invention as described in FIG. 5, the image data circuit 404 is configured to store only a single row or to store only a portion of the image data, rather than storing the entire image data. The size of the memory in the image row control circuit 510 may thereby be reduced to that of a single row or a portion of rows of the image data, rather than all of the rows of the image data. Moreover, the image row control circuit 510 can comprise a plurality of shift registers in some embodiments of the present invention, and the image row storing circuit 520 can comprise a plurality of latches.

In some embodiments, the number of stages of the shift register in the image row control circuit 510 and the number of latches in the image row storing circuit 520 may correspond to the number of pixels in a row. In some embodiments, the image data circuit 404 and/or the display driver chip 400 is free of memory that stores the plurality of rows of the image data. In other embodiments, the image data circuit 404 and/or the display driver chip 400 is free of memory that stores more than the portion of the plurality of rows of the image data.

Figure 2:
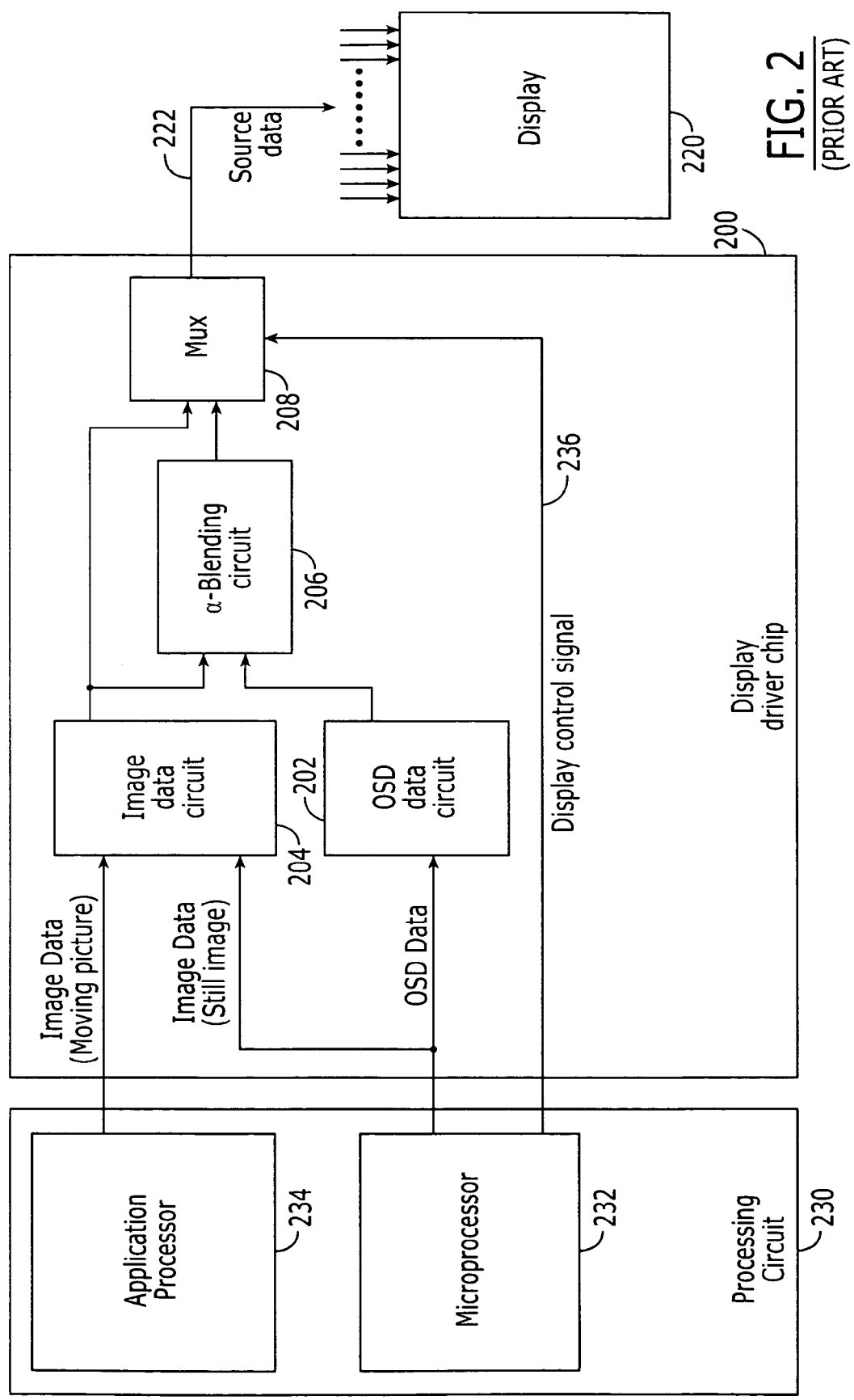
FIG. 2 is a block diagram of a conventional display driver chip.
Figure 3A:
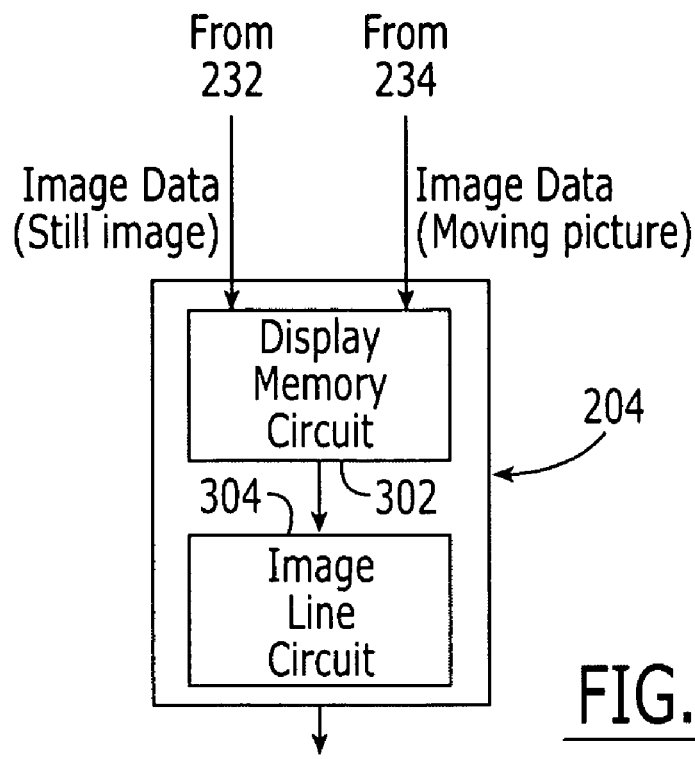
FIG. 3A is a block diagram of an image data circuit of FIG. 2.
Figure 3B:
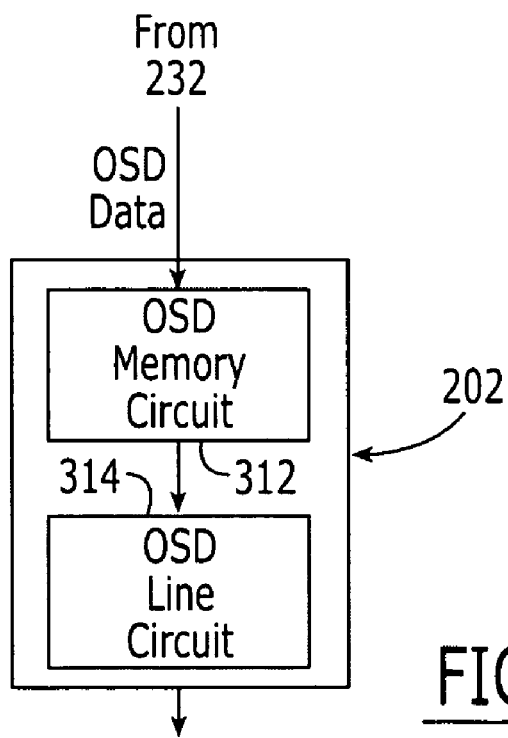
FIG. 3B is a block diagram of an OSD data circuit of FIG. 2.
Figure 6:
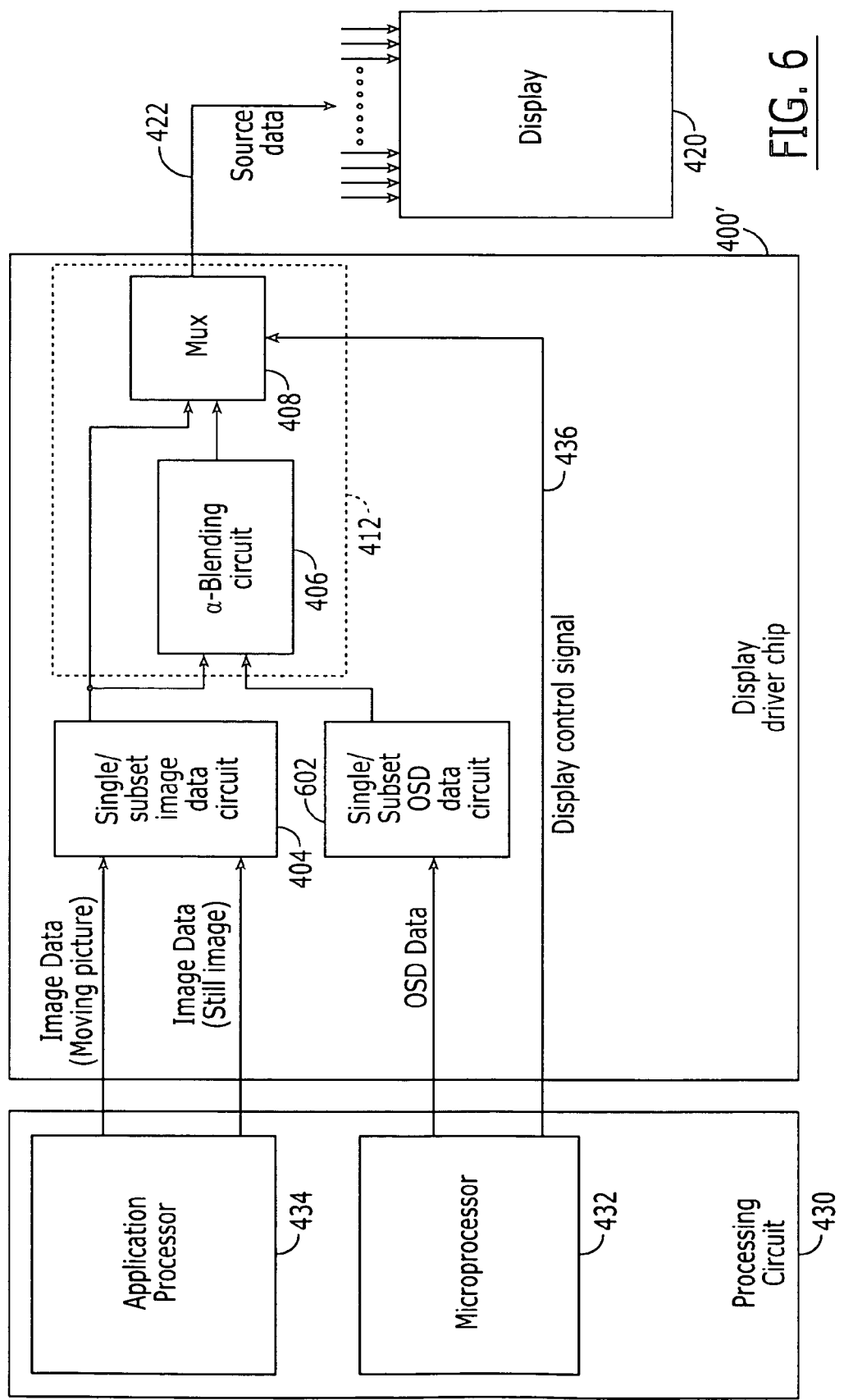
FIG. 6 is a block diagram of display driver chips according to other embodiments of the present invention.
Figure 7A:
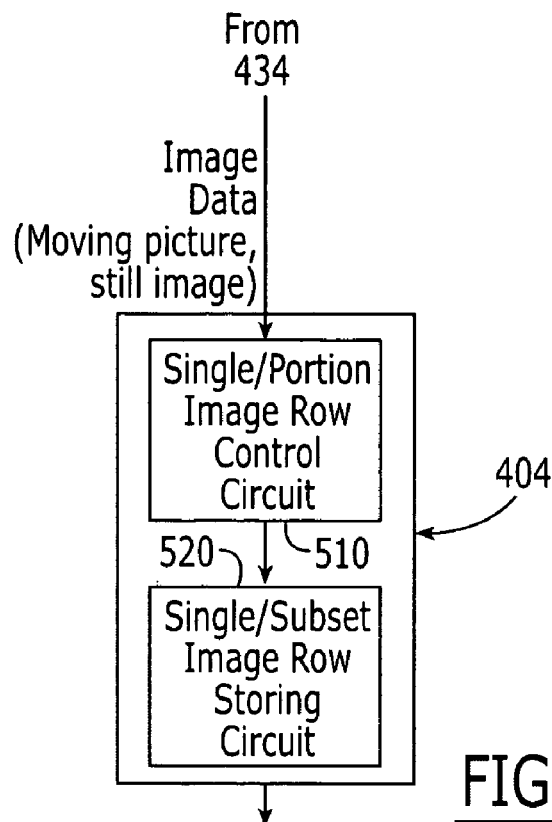
FIG. 7A is a block diagram of an image data circuit of FIG. 6 according to other embodiments of the present invention.
Figure 7B:
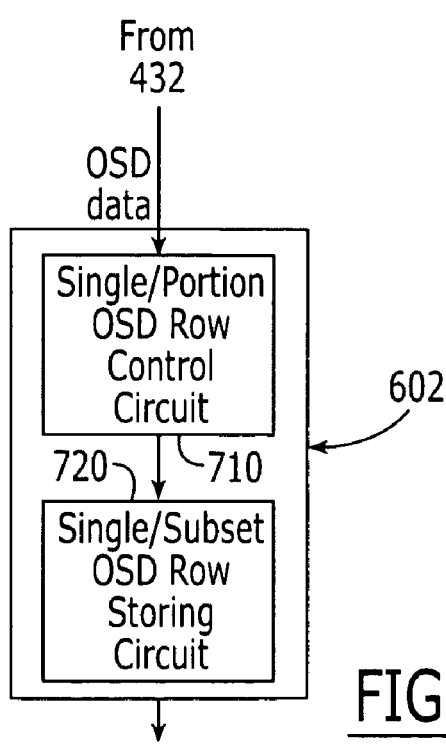
FIG. 7B is a block diagram of an OSD data circuit of FIG. 6 according to other embodiments of the present invention.

In embodiments of the present invention that were described in FIGS. 4 and 5, the OSD data circuit 402 is configured to store therein the entire OSD data, which may be similar to a conventional OSD data circuit 202 that was described in FIGS. 2 and 3B. In other embodiments of the present invention that now will be described in connection with FIGS. 6, 7A and 7B, the OSD data circuit also be reduced in size by storing therein only one line of, or a portion of, the entire OSD data at any time. Further reduction in the memory of the display driver chip may thereby be obtained according to these embodiments of the present invention. In FIGS. 6, 7A and 7B, like numbers refer to like elements of FIGS. 4 and 5, and these elements will not be described again for the sake of brevity.

Accordingly, referring to FIG. 6, a display driver chip 400' according to other embodiments of the invention includes an OSD data circuit 602 that is configured to store only a portion of the OSD data and, in some embodiments, only a single row of the OSD data, and to output the OSD data portion by portion or, in some embodiments, row-by-row. Accordingly, in these embodiments, the OSD data circuit 602 does not need to include memory for the entire OSD data. Rather, the OSD data circuit 602 can store only a single row of the OSD data at any time, or a portion of the OSD data at any time. Accordingly, the size of the display driver chip 400' may be reduced even further compared to the display driver chip 400 of FIG. 4, by allowing the size of the OSD data circuit 602 to be reduced compared to the OSD data circuit 402 of FIG. 4. It will be understood that, in other embodiments, the OSD data circuit 602 may be used with a conventional image data circuit 204.

FIGS. 7A and 7B are block diagrams of an image data circuit 404 and an OSD data circuit 602 of FIG. 6, respectively, according to some embodiments of the present invention. The construction of the image data circuit 404 of FIG. 7A may be identical to the image data circuit 404 of FIG. 5, and will not be described again for the sake of brevity.

FIG. 7B is a block diagram of an OSD data circuit 602 of FIG. 6 according to some embodiments of the present invention. As shown in FIG. 7B, the OSD data circuit 602 includes an OSD row control circuit 710 that is configured, in some embodiments, to receive the OSD data row-by-row. In other embodiments, the OSD row control circuit 710 is configured to receive the OSD data on a portion-by-portion basis. In some embodiments, the OSD row storing circuit 720 is responsive to the OSD row control circuit 710, and is configured to store a single row of the OSD data that is received row-by-row, and to output the single row of the OSD data that was stored. Thus, in some embodiments, the OSD row storing circuit 720 is a single OSD row storing circuit. In other embodiments, the OSD row storing circuit 720 is responsive to the OSD row control circuit 710, and is configured to store at least a subset of the portion of the OSD data that is received portion-by-portion, and to output the at least a subset of the OSD data that was stored. Accordingly, in some embodiments of the present invention, the OSD row storing circuit 720 is a subset (multiple row) OSD storing circuit.

In some embodiments of the present invention, the OSD row control circuit 710 comprises a plurality of shift registers, and the OSD row storing circuit 720 comprises a plurality of latches. In some embodiments, the number of shift registers corresponds to the number of pixels in a row, or a multiple of this number, but less than the entire OSD data. Moreover, in some embodiments, the number of latches corresponds to the number of pixels in a row, or a multiple of this number, but less than the entire OSD data. Accordingly, in embodiments of FIGS. 6, 7A and 7B, less than all of the OSD data may be stored in the OSD data circuit 602 at a given time, to thereby reduce the amount of OSD data circuit memory compared to an OSD data circuit that stores therein the entire OSD data.

Figure 8:
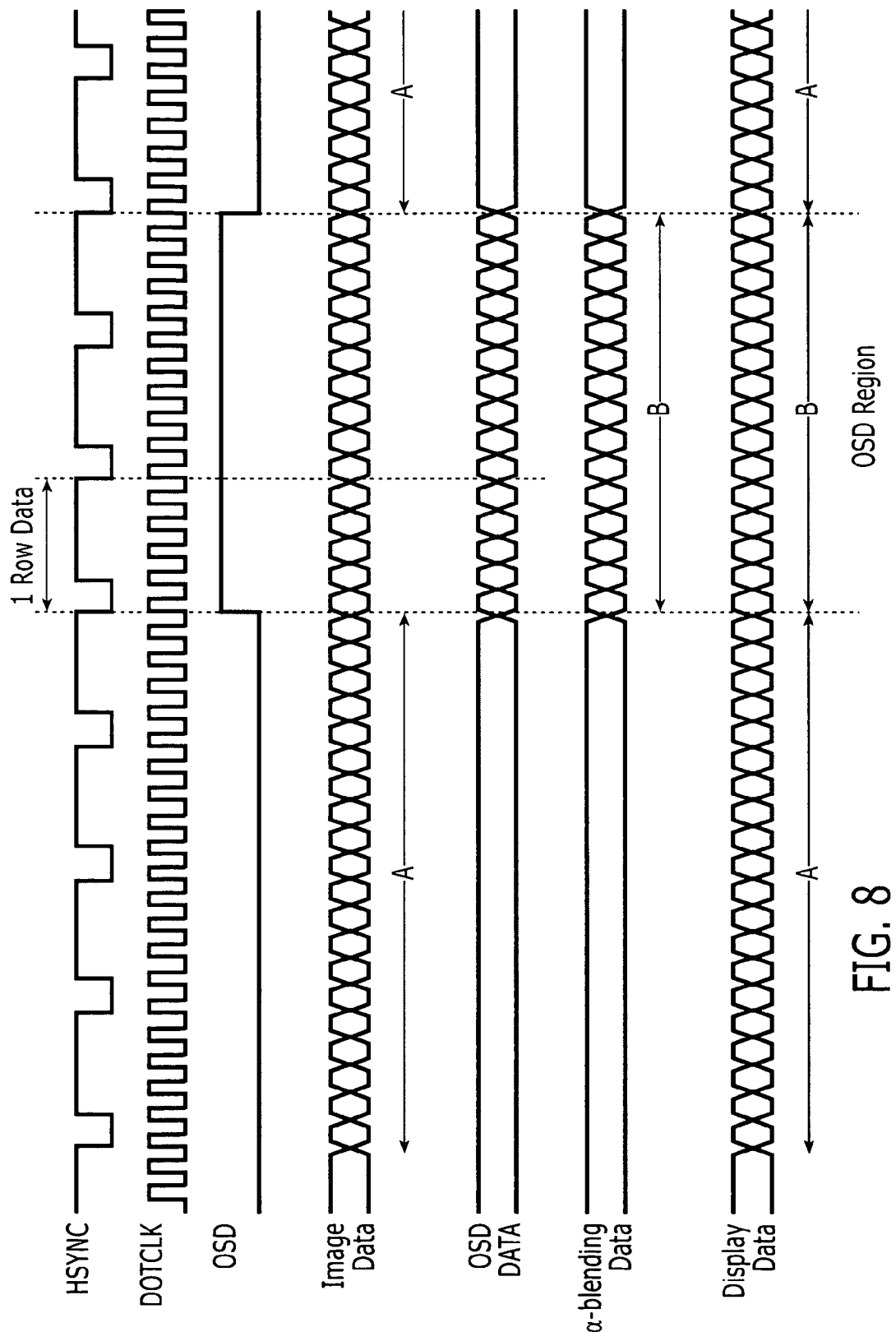
FIG. 8 is a timing diagram of operations that may be performed to generate image data and/or OSD data according to embodiments of the present invention that were described in FIGS. 4 and 5.

FIG. 8 is a timing diagram of operations that may be performed to generate image data and/or OSD data for display on a display, according to embodiments of the invention that were described in FIGS. 4 and 5. As shown in FIG. 8, an HSYNC signal provides row data timing, and a DOTCLK signal provides pixel timing. An OSD signal becomes active when the OSD data is provided to the display. Image data, such as RGB data, is provided during a time interval A when the OSD region of the display is not generated, and during a time interval B when the OSD region is generated. OSD data is provided from the OSD data block 402 during a time interval B, when the OSD region data is being provided to the display. Alpha-blending data is generated by the α-blending circuit 406 from the image data and from the OSD data during the time interval B. The display data corresponds to the image data for the time interval A, and the α-blending data for the time interval B.

Figure 9:
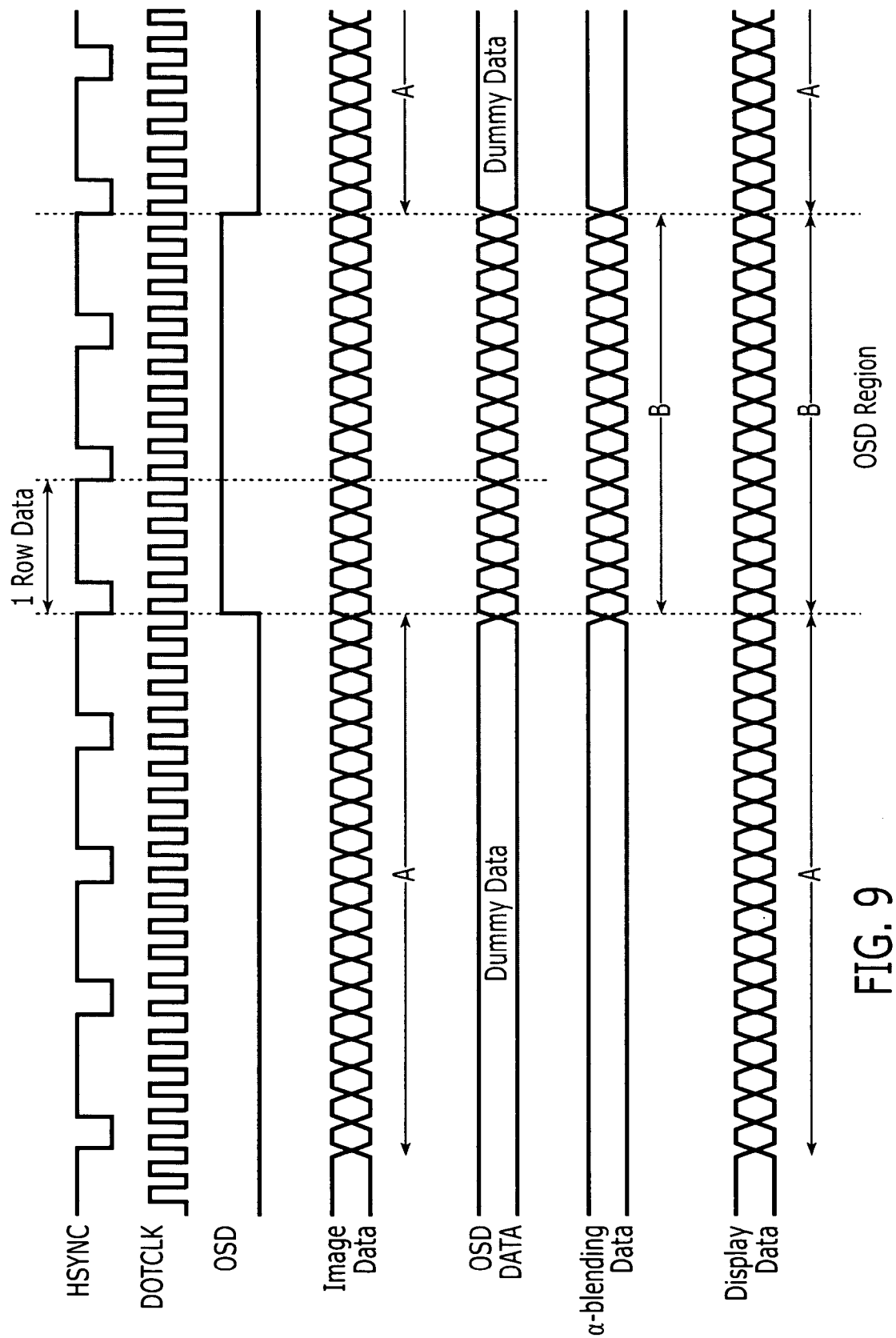
FIG. 9 is a timing diagram of operations that may be performed to generate image data and/or OSD data according to other embodiments of the present invention that were described in FIGS. 6, 7A and 7B.

FIG. 9 is a timing diagram of operations that may be performed to generate image data and/or OSD data for display on a display, according to other embodiments of the present invention that were described in FIGS. 6, 7A and 7B. In contrast with FIG. 8, dummy OSD data is provided during time interval A, so as to allow the OSD data circuit to be synchronized with the image data circuit, since the OSD data circuit does not store more than one row or more than a subset of the OSD data in these embodiments. In other embodiments, however, dummy data need not be provided.

Figure 10:
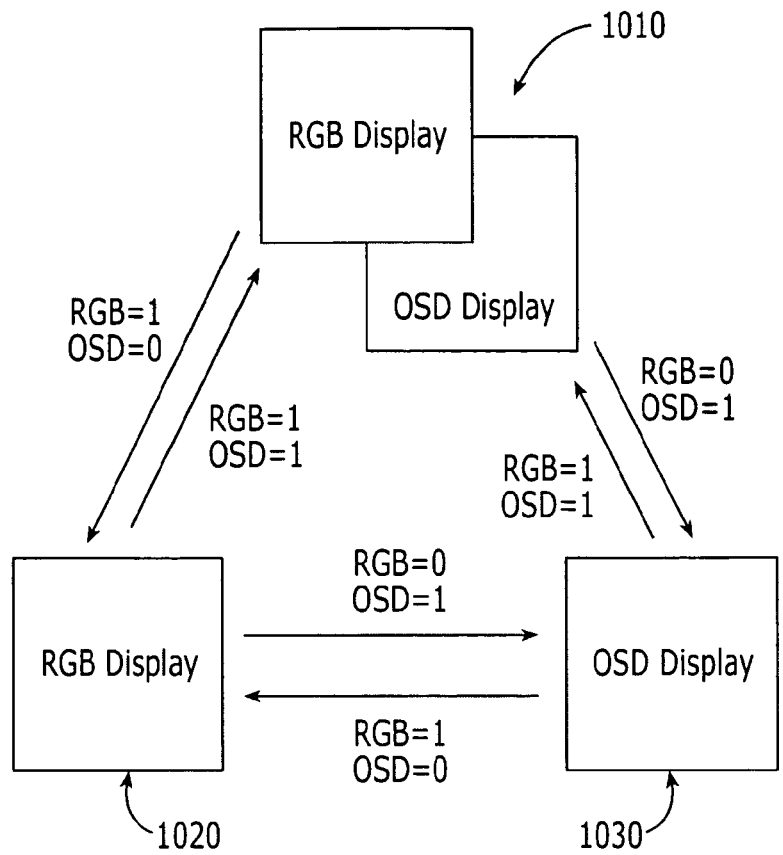
FIG. 10 is a state diagram illustrating operations for selectively displaying OSD data according to various embodiments of the present invention.

FIG. 10 is a state diagram illustrating operations for selectively displaying OSD data according to various embodiments of the present invention. As shown at Blocks 1010, when an RGB enabling signal is 1 and an OSD enabling signal is 1, then both RGB data and OSD data are displayed, which may correspond to the OSD region B of FIGS. 8 and 9. At Block 1020, when RGB is 1 and OSD is 0, then the RGB data only is displayed, which may correspond to region A of FIGS. 8 and 9. Finally, at Block 1030, when RGB is 0 and OSD is 1, only OSD data is displayed. In other words, there is no blending in the state represented by Block 1030.

Figure 11:
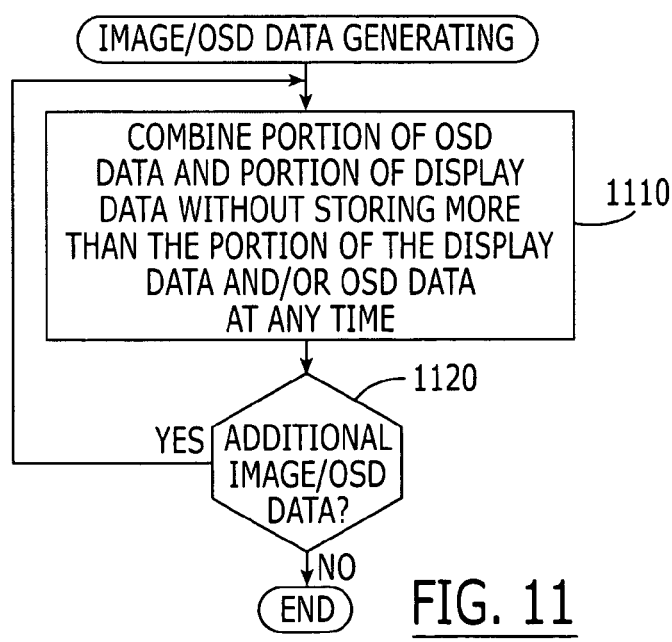
FIGS. 11-15 are flowcharts of operations that may be performed to generate image data and/or OSD data according to various embodiments of the present invention.

FIG. 11 is a flowchart of operations that may be performed according to some embodiments of the invention, to generate image data and/or OSD data for display on a display having a plurality of rows of pixels. As shown in Block 1110, a portion of the OSD data and a portion of the display data are repeatedly combined in a display driver chip, without storing more than the portion of the display data in the display driver chip at any time. At Block 1120, if additional image and/or OSD data is present, then the operations of Block 1110 are repeatedly performed, to thereby repeatedly combine a portion of the OSD data and a portion of the display data in a display driver chip, without storing more than the portion of the display data in the display driver chip at any time. It will be understood that, in some embodiments of the present invention, the portion of the OSD data is a single row of OSD data, and the portion of the image data is a single row of image data. In other embodiments of the present invention, the portion of the OSD data is at least two rows of OSD data, and the portion of the image data is at least two rows of the image data. In still other embodiments of the present invention, repeatedly combining operations of Blocks 1110 and 1120 are performed by repeatedly combining a portion of the OSD data and a portion of the display data in a display driver chip, without storing more than the portion of the display data and without more than the portion of the OSD data in the display driver chip at any time.

Figure 12:
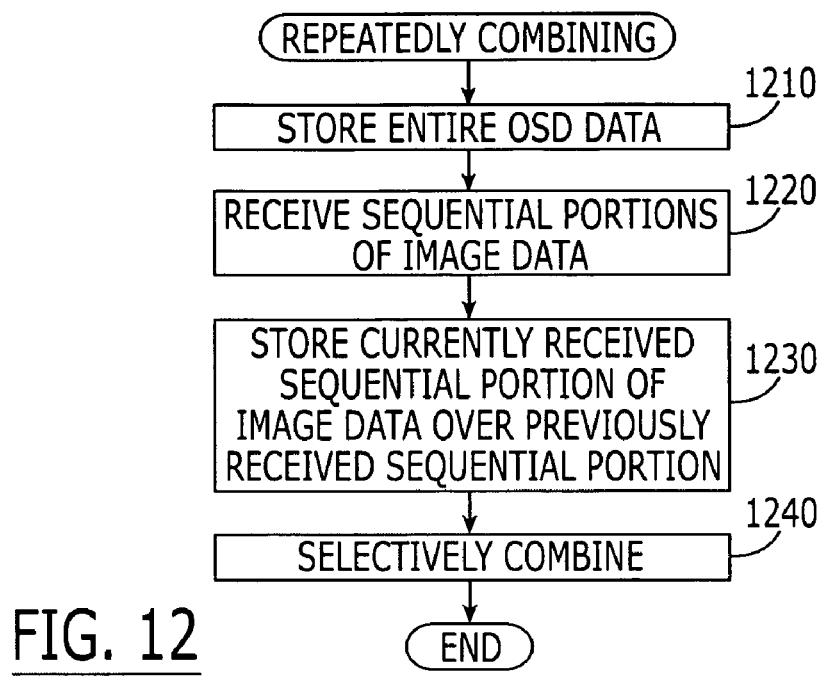

FIG. 12 is a flowchart of operations that may be performed to repeatedly combine a portion of the OSD data and a portion of the display data without storing more than the portion of the display data in the driver chip at any time, which may correspond to Blocks 1110 and 1120 of FIG. 11, and which may correspond to the embodiments of FIGS. 4, 5 and 8. Referring now to FIG. 12, at Block 1210, the entire OSD data is stored in the display driver chip. At Block 1220, sequential portions of the image data are received at the display driver chip. At Block 1230, a currently received sequential portion of the image data is stored over a previously received sequential portion of the image data in the display driver chip. Finally, at Block 1240, a sequential portion of the OSD data that is stored in the display driver chip and the currently received sequential portion of the image data that is stored in the display driver chip are combined.

Figure 13:
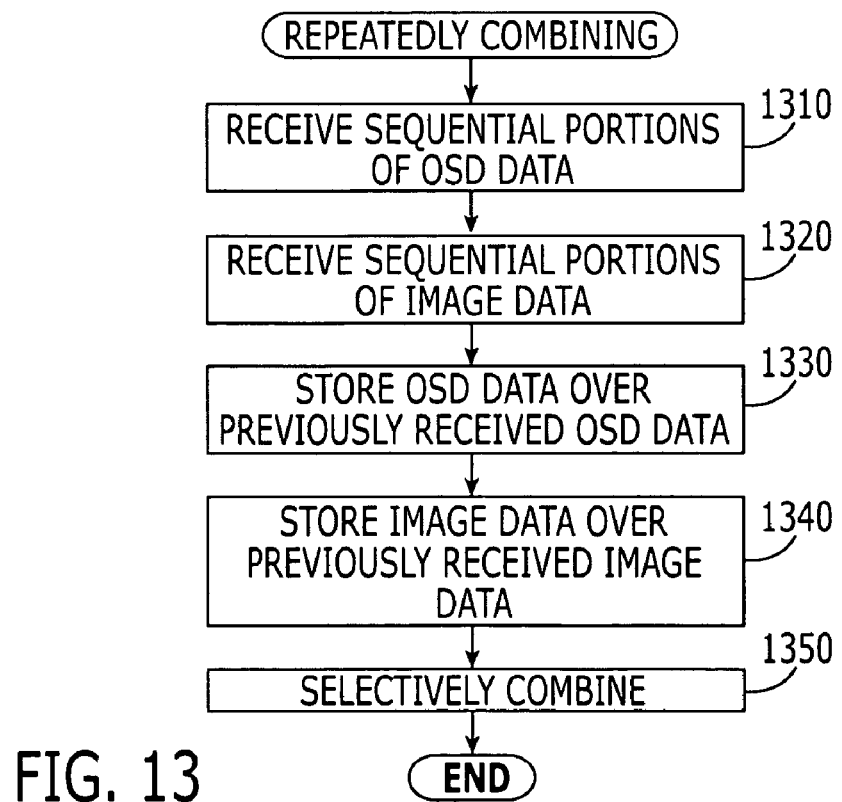

FIG. 13 is a flowchart of operations that may be performed to repeatedly combine a portion of the OSD data and a portion of the display data in a display driver chip without storing more than the portion of the display data and without storing more than a portion of the OSD data in the driver chip at any time, which may correspond to Blocks 1110 and 1120 of FIG. 11, and embodiments of FIGS. 6, 7A, 7B and 9. As shown at Block 1310, sequential portions of the OSD data are received at the display driver chip. At Block 1320, sequential portions of the image data are received at the display driver chip. At Block 1330, a currently received sequential portion of the OSD data is stored over a previously received sequential portion of the OSD data in the display driver chip. At Block 1340, a currently received sequential portion of the image data is stored over a previously received sequential portion of the image data in the display driver chip. Finally, at Block 1350, the currently received sequential portion of the image data and the currently received sequential portion of the OSD data that are stored in the display driver chip are selectively combined.

Figure 14:
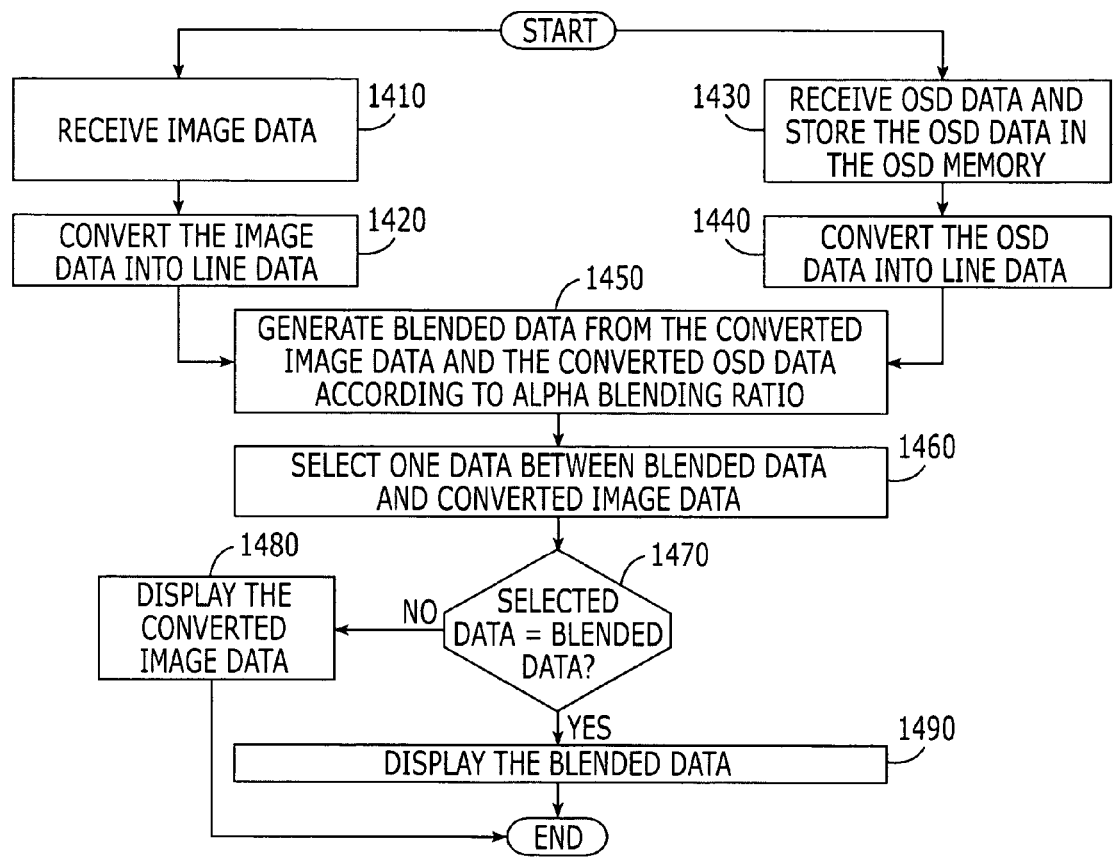

FIG. 14 is a more detailed flowchart of embodiments of the present invention that were described, for example, in FIG. 12. As shown in FIG. 14, at Block 1410, image data is received, for example at the image row control circuit 510. At Block 1420, the image data is converted into line data, for example by the image row storing circuit 520. At Block 1430, OSD data is received and stored in the OSD memory, for example in the OSD data circuit 402. At Block 1440, the OSD data is converted to line data.

Continuing with the description of FIG. 14, at Block 1450, blended data is generated from the converted image data and the converted OSD data according to an α-blending ratio, for example by the α-blending circuit 406. At Block 1460, a selection is made between the blended data and the converted image data, for example by the multiplexer 140. At Block 1470, if the blended data is selected, then the blended data is displayed, for example as shown in area B of FIG. 9. On the other hand, if the blended data is not selected at Block 1470, then the converted image data is displayed, for example as shown at area A of FIG. 9.

Figure 15:
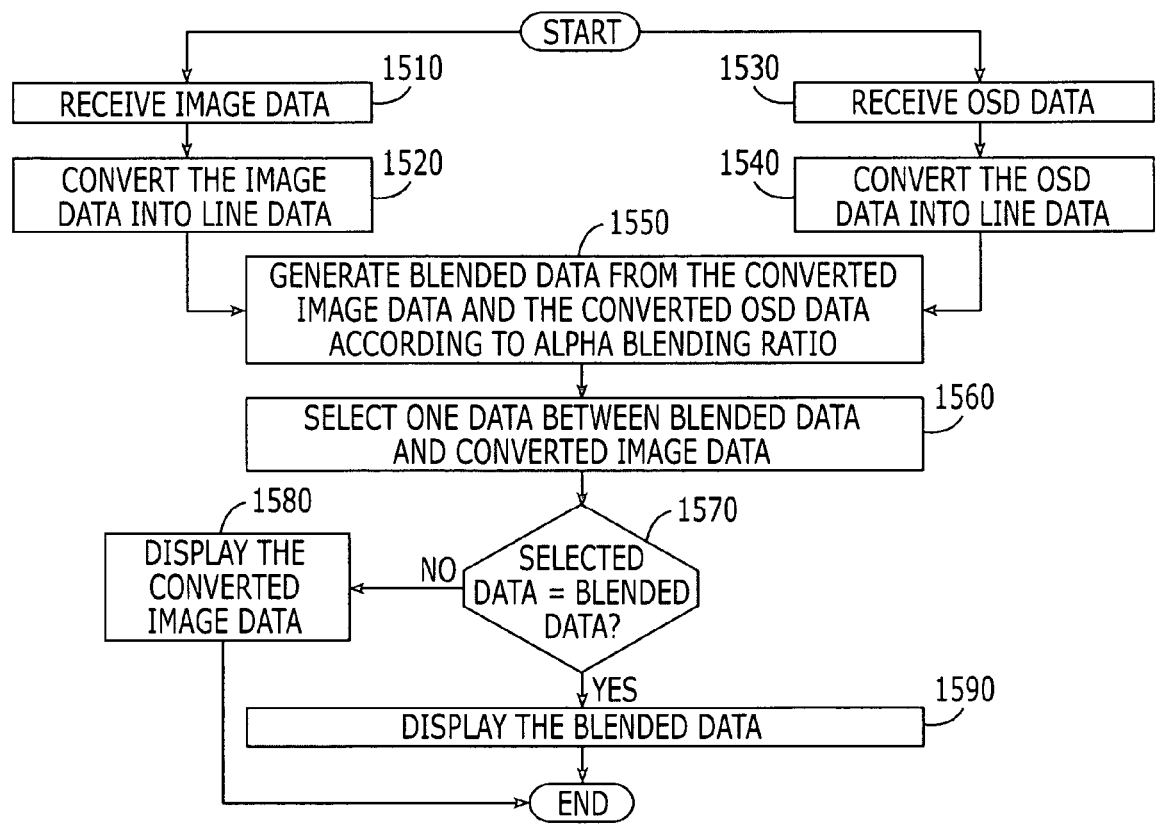

FIG. 15 is a more detailed flowchart of embodiments of the present invention that were described, for example, in FIG. 13. Referring to FIG. 15, at Block 1510, the image data is received, for example at the image row control circuit 510, and at Block 1520, the image data is converted into line data, for example by the image row storing circuit 520. At Block 1530, the OSD data is received, for example by the OSD row control circuit 710, and at Block 1540, the OSD data is converted to line data, for example by the OSD storing circuit 720. At Block 1550, the blended data is generated from the converted image data and the converted OSD data according to an α-blending ratio, for example by the α-blending block 406. At Block 1560, a selection is made between the blended data and the converted image data, for example using the multiplexer 408. At Block 1570, if the blended data is selected, then the blended data is displayed at Block 1590, which may correspond to the OSD region B in FIG. 9. On the other hand, if the blended data is not selected at Block 1570, then the converted image data is displayed at Block 1580, which may correspond to region A of FIG. 9.

Accordingly, some embodiments of the present invention may allow the size of the image data circuit include in a display driver chip to be reduced, which can thereby allow reduction in the size and/or power consumption of the display driver chip. In other embodiments of the invention, the size of the OSD data circuit may be reduced or also may be reduced, which can allow decrease or a further decrease in size and/or power consumption of the display driver chip.

In the drawings and specification, there have been disclosed embodiments of the invention and, although specific terms are employed, they are used in a generic and descriptive sense only and not for purposes of limitation, the scope of the invention being set forth in the following claims.

What is claimed is:

1. A display driver chip for displaying image data and/or On-Screen Display (OSD) data on a display having a plurality of rows of pixels, the display driver chip comprising:
   an OSD data circuit that is configured to store at least a portion of the OSD data and to output the stored OSD data row-by-row;
   an image data circuit that is configured to store only a single row of the image data to be displayed and to output the single row of the image data that was stored; and
   a combining circuit that is configured to selectively blend the row-by-row OSD data and the single row of the image data, to drive the display;
   wherein the display driver chip is free of memory that stores a plurality of rows of image data;
   wherein the image data circuit is further configured to receive the image data directly from a processing system that is external of the display driver chip;
   wherein the image data circuit comprises:
      an image row control circuit that is configured to receive the image data row-by-row; and
      a single image row storing circuit that is responsive to the image row control circuit and that is configured to store a single image row of the image data that is received row-by row and to output the single image row of the image data that was stored; and
   wherein the image row control circuit comprises a shift register and wherein the single image row storing circuit comprises a plurality of latches, wherein a row includes a predetermined number of pixels, wherein the shift register includes the same predetermined number of stages and wherein the plurality of latches includes the same predetermined number of latches.

2. A display driver chip according to claim 1 wherein the OSD data circuit comprises:
   an OSD memory circuit that is configured to store the entire OSD data; and
   an OSD row storing circuit that is responsive to the OSD memory circuit and that is configured to store a row of the OSD data from the OSD memory circuit, and to output the row of the OSD data that was stored.

3. A display driver chip according to claim 2 wherein the combining circuit comprises:
   an alpha-blending circuit that is responsive to the OSD row storing circuit and the single row of image data that is output, and that is configured to selectively blend the row of OSD data and the single row of image data; and
   a multiplexer that is responsive to the alpha-blending circuit and to the single row of image data that is output and that is configured to multiplex the row of OSD data and the single row of image data that are selectively blended, and the single row of image data, in response to a display control signal.

4. A display driver chip according to claim 1 wherein the combining circuit comprises:
   an alpha-blending circuit that is responsive to the row-by-row OSD data that is output and to the single row of image data that is output, and that is configured to selectively blend the row-by-row OSD data and the single row of image data; and
   a multiplexer that is responsive to the alpha-blending circuit and to the single row of image data that is output, and that is configured to multiplex the row-by-row OSD data and the single row of image data that are selectively blended, and the single row of image data, in response to a display control signal.

5. A display driver chip according to claim 1 wherein the image data comprises RGB data.

6. A display driver chip according to claim 1 in combination with a display having the plurality of rows that is configured to be driven by the combining circuit.

7. A display driver chip according to claim 1 wherein the OSD data circuit is further configured to receive the OSD data directly from the processing system that is external of the display driver chip.

8. A display driver chip according to claim 7 wherein the processing system comprises:
   an application processor that is configured to provide the image data directly to the image data circuit; and
   a microprocessor that is configured to provide the OSD data directly to the OSD data circuit.

9. A display driver chip for displaying image data and/or On-Screen Display (OSD) data on a display having a plurality of rows of pixels, the display driver chip comprising:
   an OSD data circuit that is configured to store at least a portion of the OSD data and to output the stored OSD data row-by-row;
   an image data circuit that is configured to store only a single row of the image data to be displayed and to output the single row of the image data that was stored; and
   a combining circuit that is configured to selectively blend the row-by-row OSD data and the single row of the image data, to drive the display;
   wherein the display driver chip is free of memory that stores a plurality of rows of image data;
   wherein the image data circuit is further configured to receive the image data directly from a processing system that is external of the display driver chip;
   wherein the OSD data circuit comprises:
      an OSD row control circuit that is configured to receive the OSD data row-by-row; and
      a single OSD row storing circuit that is responsive to the OSD row control circuit and that is configured to store a single row of the OSD data that is received row-by row, and to output the single row of the OSD data that was stored; and
   wherein the OSD row control circuit comprises a shift register and wherein the single OSD row storing circuit comprises a plurality of latches, wherein a row includes a predetermined number of pixels, wherein the shift register includes the same predetermined number of stages and wherein the plurality of latches includes the same predetermined number of latches.

10. A display driver chip according to claim 9 wherein the OSD data circuit is free of memory that stores a plurality of rows of the OSD data.

11. A display driver chip according to claim 9 wherein the combining circuit comprises:
   an alpha-blending circuit that is responsive to the single OSD row storing circuit and the single row of image data that is output, and that is configured to selectively blend the single row of OSD data and the single row of image data; and a multiplexer that is responsive to the alpha-blending circuit and to the single row of image data that is output and that is configured to multiplex the single row of OSD data and the single row of image data that are selectively blended, and the single row of image data, in response to a display control signal.

12. A display driver chip according to claim 9 wherein the image data comprises RGB data.

13. A display driver chip according to claim 9 in combination with a display having the plurality of rows that is configured to be driven by the combining circuit.

14. A display driver chip according to claim 9 wherein the OSD data circuit is further configured to receive the OSD data directly from the processing system that is external of the display driver chip.

15. A display driver chip according to claim 14 wherein the processing system comprises:
an application processor that is configured to provide the image data directly to the image data circuit; and
a microprocessor that is configured to provide the OSD data directly to the OSD data circuit.

* * * * *